US010640923B2

(12) United States Patent
Hietaniemi et al.

(10) Patent No.: US 10,640,923 B2
(45) Date of Patent: May 5, 2020

(54) METHOD FOR TREATING STARCH IN PULP, PAPER AND BOARD MAKING PROCESSES

(71) Applicant: Kemira Oyj, Helsinki (FI)

(72) Inventors: Matti Hietaniemi, Espoo (FI); Jaakko Ekman, Helsinki (FI); Asko Karppi, Turku (FI); Marko Kolari, Vantaa (FI)

(73) Assignee: Kemira Oyj, Helsinki (FI)

( * ) Notice: Subject to any disclaimer, the term of this patent is extended or adjusted under 35 U.S.C. 154(b) by 164 days.

(21) Appl. No.: 15/755,591

(22) PCT Filed: Aug. 26, 2016

(86) PCT No.: PCT/FI2016/050583
§ 371 (c)(1),
(2) Date: Feb. 27, 2018

(87) PCT Pub. No.: WO2017/032927
PCT Pub. Date: Mar. 2, 2017

(65) Prior Publication Data
US 2019/0024306 A1    Jan. 24, 2019

(30) Foreign Application Priority Data

Aug. 27, 2015 (FI) ...................................... 20155612

(51) Int. Cl.
| | | |
|---|---|---|
| *D21C 5/00* | (2006.01) | |
| *D21C 5/02* | (2006.01) | |
| *D21H 11/14* | (2006.01) | |
| *D21H 17/37* | (2006.01) | |
| *D21H 17/43* | (2006.01) | |
| *D21H 17/45* | (2006.01) | |
| *D21H 21/18* | (2006.01) | |
| *D21H 21/36* | (2006.01) | |

(52) U.S. Cl.
CPC ............... *D21C 5/005* (2013.01); *D21C 5/02* (2013.01); *D21H 11/14* (2013.01); *D21H 17/375* (2013.01); *D21H 17/43* (2013.01); *D21H 17/455* (2013.01); *D21H 21/18* (2013.01); *D21H 21/36* (2013.01); *Y02W 30/648* (2015.05)

(58) Field of Classification Search
CPC . D21C 5/00; D21C 5/02; D21C 5/005; D21C 5/022; D21H 11/14; D21H 21/36; D21H 17/28; D21H 17/375; D21H 7/37; D21H 17/41; D21H 17/42; D21H 17/43; D21H 17/44; D21H 17/45; D21H 17/455; D21H 17/34; D21H 21/18; Y02W 30/64; Y02W 30/648
USPC .......................... 162/4, 147, 161, 168.3, 175
See application file for complete search history.

(56) References Cited

U.S. PATENT DOCUMENTS

| | | | |
|---|---|---|---|
| 8,840,760 B2 | 9/2014 | Gracia Grandia | |
| 2013/0186584 A1* | 7/2013 | Krapsch | D21H 17/28 162/161 |
| 2014/0242191 A1 | 8/2014 | Kolari et al. | |
| 2014/0284011 A1* | 9/2014 | Krapsch | D21C 5/02 162/168.3 |
| 2015/0041092 A1* | 2/2015 | Hietaniemi | D21H 27/002 162/168.4 |

FOREIGN PATENT DOCUMENTS

WO    0011267 A1    3/2000

OTHER PUBLICATIONS

Finnish Patent and Registration Office, Search report, FI20155612, , dated Feb. 10, 2016.
Finnish Patent and Registration Office, Office Action, FI20155612, dated Jun. 7, 2017.

* cited by examiner

*Primary Examiner* — Eric Hug
(74) *Attorney, Agent, or Firm* — Berggren LLP; Leea Susanne Somersalo

(57) ABSTRACT

The invention relates to a method for treating starch in pulp, paper and board making processes, in which processes recycled fibre material is used as raw material wherein the recycled fibre material is pulped in a pulper and obtaining a pulp flow comprising an aqueous phase and at least recycled fibres and starch dispersed in the aqueous phase. The method comprising the following steps: —adding amylase enzyme inhibitor and/or at least one biocide to pulp flow or to an aqueous process flow comprising starch for preventing starch degradation, and—adding an amphoteric polymer obtained by copolymerisation of (meth)acrylamide with cationic and anionic monomers to pulp flow or to an aqueous process flow comprising starch for binding starch to the fibres.

20 Claims, No Drawings

METHOD FOR TREATING STARCH IN PULP, PAPER AND BOARD MAKING PROCESSES

PRIORITY

This application is a U.S national application of PCT-application PCT/FI2016/050583 filed on Aug. 26, 2016 and claiming priority of Finnish application FI 20155612 filed on Aug. 27, 2015, the contents of all of which are incorporated herein by reference.

The present invention relates to a method for treating starch in pulp, paper and board making processes according to the preamble of the independent claim presented below.

Recycled fibre material is commonly used as raw material for paper or board. The recycled fibre material comprises in addition to the fibres a number of other substances. Typically recycled fibre material comprises starch, which has low molecular weight. This starch typically originates from the surface sizing of the paper or board, and it retains poorly on the fibres as it typically has no charge. There may also be small amounts starches with cationic and anionic charges. Due to its small size starch is not effectively separated at the screening either. Thus the low molecular weight starch remains in the water circulation of the pulping and papermaking processes or it is removed together with the screen effluent to the wastewater treatment. In the water circulation the starch increases the risk for microbial growth, as it is suitable nutritive substance for various microbes. Microbes may affect both the functioning of the chemistry of papermaking and/or the quality of the end product. High microbial activity can lower the pH and have a marked effect on wet-end chemistry. High microbial activity can also create strong odours that may be a nuisance or even a danger to operating personnel, and also destructive for product quality in packaging grades. Slime formation, biofilms, on the surfaces of tanks and machine frames leads to paper defects, such as spots and holes, or web breaks when slime lumps are sloughing off. In the wastewater treatment the low molecular weight starch increases the COD load of the water to be treated, and thus it increases the wastewater treatment costs.

The amount of low molecular weight starch in the recycled fibre material may be relatively high, for example 1-6% of the total weight of the recycled fibre. When the starch is lost to the water circulation during pulp preparation process the yield of the process is naturally decreasing. Therefore a process that would prevent the starch enrichment to the water circulation and assist its retention to the recycled fibres would provide numerous advantages.

Amylase is an enzyme that catalyses degradation of starch. It is produced by many microorganisms, both fungi and bacteria. As described above, process waters in the pulp, paper and board making processes can contain various microorganisms capable of using starch as nutrient. Growing microbes excrete amylase enzymes in their surroundings and amylase enzyme cleaves starch to monosaccharides of which microbes can then metabolize inside the microbial cells. Microbial growth is typically prevented by adding biocides to the process waters of pulp, paper and board making processes.

It is previously known to use biocidal composition combining Zn ions with one or more biocides for preventing or reducing starch degradation in paper, pulp or board making processes, as is presented in the specification WO2013/045638. However, as the uncharged starch retains poorly on the fibres, the starch protected from degradation might still end up into the wastewater flow where it increases the COD load of the waste water to be treated.

It is an object of the present invention to reduce or even eliminate the above-mentioned problems appearing in prior art.

The object of the invention is to provide a method for treating starch in pulp, paper and board making processes, which method makes possible both starch preservation and retention, i.e. the degradation of the starch can be efficiently prevented and the retention of the starch protected from degradation can be efficiently improved.

It is especially an object of the present invention to provide a method with which the retention of starch, especially low molecular weight starch, is improved when using recycled fibre as a raw material.

A further object of the invention is to provide a method with which the amount of starch, especially low molecular weight starch, may be reduced in the water circulation when pulping recycled fibre material.

In order to achieve among others the objects presented above, the invention is characterized by what is presented in the characterizing parts of the enclosed independent claims.

Some preferred embodiments of the invention will be described in the other claims.

A typical method according to the invention for treating starch in pulp, paper and board making processes, in which processes recycled fibre material is used as raw material wherein the recycled fibre material, such as paper, board and/or broke, is pulped in a pulper and obtaining a pulp flow comprising an aqueous phase and at least recycled fibres and starch dispersed in the aqueous phase, the method comprising at least the following steps:

adding amylase enzyme inhibitor and/or at least one biocide to pulp flow or to an aqueous process flow comprising starch for preventing starch degradation, and adding an amphoteric polymer obtained by copolymerisation of (meth)acrylamide with cationic and anionic monomers to pulp flow or to an aqueous process flow comprising starch for binding starch to the fibres.

The method according to the invention is based on it that firstly, the starch degradation is prevented by using amylase enzyme inhibitor and/or biocide, and secondly the retention of the protected starch is improved by adding an amphoteric polymer comprising cationic and anionic monomers to pulp flow or to an aqueous process flow comprising starch. Now, it has been found that the presented amphoteric polymer acts effectively when it has been added to starch-containing pulp or process flow in combination with amylase enzyme inhibitor and/or one or more biocides. Especially low molecular weight starch in the recycled pulp may be agglomerated by addition of said amphoteric polymer for forming agglomerates which are large enough to be retained on the fibres or to the formed web. Furthermore, the agglomerates formed with said amphoteric polymer have surface charges that assist in their retention on the fibres. Starch retention on the fibres can be further improved by adding cationic coagulant with the amphoteric polymer to the pulp flow or the process flow. It is also found that the presented combination provides unexpected improvements in the dry strength of the paper or board. When starch retention to fibres is improved, also the runnability and dewatering of the paper production can be improved. It has been noticed that the amount of starch in the circulating process water is clearly reduced, when said amylase enzyme inhibitor and/or biocide additions with amphoteric polymer addition according to the present invention are performed. Furthermore, the overall process yield is improved when more of the starch in the recycled fibre material can be retained to the fibres and consequently, to the formed board or paper web. Thus, the presented combination decreases the need of new starch to be added to the process and also decreases COD load of the waste water to be treated.

When the starch degradation is substantially inhibited and the retention improved by using the method according to the invention, also the strength properties of the formed paper or board will be improved. There are many possible benefits as a result of the improved strength, e.g. decreasing of the energy consumption in the refining without losing strength, decreasing of the basis weight (g/m$^2$) of paper or board while maintaining same strength, and enabling increased use of the recycled fibre material in the finished product. Further it is possible to use fibre material with lower quality which, of course, decrease material costs. Also, the amount of the surface size starch to be added can be decreased and thus also the production rate of the paper or board machine can be increased due to the lower need of drying.

Typical method according to an embodiment of the present invention for making of paper, tissue, board or the like, by using recycled fibre material as a raw material, the method comprising following steps:
pulping recycled fibre material, such as recycled paper, board or the like and/or broke, in a pulper and obtaining a pulp flow comprising an aqueous phase and at least recycled fibres and starch dispersed in the aqueous phase;
adding amylase enzyme inhibitor and/or at least one biocide to pulp flow or to an aqueous process flow comprising starch;
adding an amphoteric polymer to the pulp flow or to an aqueous process flow comprising starch;
allowing the amphoteric polymer to interact with the starch and optionally forming aggregates; and
adding at least one cationic coagulant, after the addition of the amphoteric polymer, to any flow, which comprises interacted amphoteric polymer, and forming a treated flow with starch comprising agglomerate(s);
retaining at least part of the said aggregates and/or the said agglomerates to the fibres or to a web, which is formed.

According to one preferred embodiment of the invention the COD value of the treated flow is reduced with at least 5%, preferably at least 10%, more preferably at least 20%, from the COD value of the aqueous process flow before the addition of said amphoteric polymer in combination with amylase enzyme inhibitor and/or at least one biocide, when the COD value is measured from the filtrate of said process flow.

In this application recycled fibre material refers to recycled paper and/or recycled board or the like, which comprise fibres and starch, optionally also other constituents. The recycled fibre material also refers to broke, which originates in any step of the paper or board manufacturing as a rejected material. Pulp and pulp flow is understood to comprise an aqueous phase and a solid material phase, which includes fibres and other possible solids.

In the method according to the invention, starch originates mainly from the recycled fibre material.

In a typical embodiment of the invention, the starch is a low molecular weight starch. In this application the terms "low molecular starch", "low molecular weight starch" and "starch having a low molecular weight" are interchangeable and they are used as synonyms to each other. The low molecular weight starch in the recycled pulp originates normally from surface sizing, and it is typically oxidised starch, acid modified starch, enzyme modified starch, or thermally modified starch, when starch has degraded in a controlled manner having a desired molecular weight. The low molecular weight starch may be, for example, oxidized surface starch having a weight average in the range of 100 000-5 000 000 g/mol, more typically 200 000-4 000 000 g/mol. Alternatively, the low molecular weight starch may be an acid modified or enzyme modified surface starch having a weight average in the range of 30 000-3 000 000 g/mol, more typically 40 000-2 000 000 g/mol. Typically pulp, which is obtained by pulping recycled fibre material, comprises low molecular starch from different sources. This means that the low molecular starch in process presently described may comprise oxidized surface starch as well as acid modified, enzyme modified surface starch and/or thermally modified starch.

Surface size starches may be specified based on the viscosity of the cooked starch, typical viscosity levels being between 15-400 mPas, more typically between 20-300 mPas at 70° C. at 10% concentration. Charge densities of enzyme modified starches are very low, being quite near to zero at pH 7, e.g. between −0.05-0 meq/g absolute starch. Oxidized starches are typically more anionic compared to enzyme modified starches, being about −0.3--0.01 meq/g, more typically about −0.2--0.02 meq/g calculated of absolute starch.

The amylase enzyme inhibitor may be any substance that inhibits the formation of or deactivates the amylase enzyme, such as a zinc inhibitor.

According to a preferred embodiment of the invention the amylase enzyme inhibitor comprises zinc ions. The source of the zinc ions can be inorganic or organic zinc compound, in particular an inorganic or organic zinc salt. Preferably, the zinc ion source is selected from $ZnBr_2$, $ZnCl_2$, $ZnF_2$, $ZnI_2$, $ZnO$, $Zn(OH)_2$, $ZnS$, $ZnSe$, $ZnTe$, $Zn_3N_2$, $Zn_3P_2$, $Zn_3As_2$, $Zn_3Sb_2$, $ZnO_2$, $ZnH_2$, $ZnC_2$, $ZnCO_3$, $Zn(NO_3)_2$, $Zn(ClO_3)_2$, $ZnSO_4$, $Zn_3(PO_4)_2$, $ZnMoO_4$, $ZnCrO_4$, $Zn(AsO_2)_2$, $Zn(AsO_4)_2$, $Zn(O_2CCH_3)_2$, or zinc metal, or a combination thereof. Preferred are the zinc salts $ZnCl_2$, $ZnBr_2$, $ZnSO_4$ and $Zn(O_2CCH_3)_2$.

New production of amylase enzyme by growing microbes can be prevented by controlling microbial growth by adding at least one biocide to pulp flow or to an aqueous process flow. The biocide may be any suitable biocide, which reduces the number of microbes in the process. According to an embodiment of the invention the biocide can be an oxidizing biocide or non-oxidizing biocide.

In an embodiment of the invention, the non-oxidizing biocides can include glutaraldehyde, 2,2-dibromo-3-n itrilo-propionamide (DBNPA), 2-bromo-2-nitropropane-1,3-diol (Bronopol), quaternary ammonium compounds, carbamates, 5-chloro-2-methyl-4-isothiazolin-3-one (CMIT), 2-methyl-4-isothiazolin-3-one (MIT), 1,2-dibromo-2,4-dicyanobutane, bis(trichloromethyl)sulfone, 2-bromo-2-nitrostyrene, 4,5-dichloro-1,2-dithiol-3-one, 2-n-octyl-4-isothiazolin-3-one, 1,2-benzisothiazlin-3-one, ortho-phthaldehyde, quaternary ammonium compounds (="quats"), such as n-alkyl dimethyl benzyl ammonium chloride, didecyl dimethyl ammonium chloride (DDAC) or alkenyl dimethylethyl ammonium chloride, guanidines, biguanidines, pyrithiones, 3-iodopropynyl-N-butylcarbamate, phosphonium salts, such as tetrakis hydroxymethyl phosphonium sulfate (THPS), dazomet, 2-(thiocyanomethylthio) benzothiazole, methylene bisthiocyanate (MBT), and a combination thereof. Preferred non-oxidizing biocides are selected from glutaraldehyde, 2,2-dibromo-3-n itrilopropionamide (DBNPA), 2-bromo-2-nitropropane-1,3-diol (Bronopol), quaternary ammonium compounds, carbamates, 5-chloro-2-methyl-4-isothiazolin-3-one (OMIT) and 2-methyl-4-isothiazolin-3-one (MIT).

According to an embodiment of the invention, the oxidizing biocides can include an oxidant selected from chlorine, alkali and alkaline earth hypochlorite salts, hypochlorous acid, chlorinated isocyanurates, bromine, alkali and alkaline earth hypobromite salts, hypobromous acid, bromine chloride, chlorine dioxide, ozone, hydrogen peroxide, peroxy compounds, such as peracetic acid, performic acid, percarbonate or persulfate salts, halogenated hydantoins, e.g., monohalodimethylhydantoins such as monochlorodimethylhydantoin, or dihalodimethylhydantoins such as chlorobromodimethylhydantoin, monochloramines, monobromamines, dihaloamines, trihaloamines, or a combination thereof. The oxidant can be combined with an optionally substituted N-hydrogen compound, which may be selected from ammonium salts, ammonia, urea, hydantoin, isothiazoline-1,1-dioxide, ethanolamine, pyrrolidone, 2-pyrrolidone, ethylene urea, N-methylolurea, N-methylurea, acetylurea, pyrrole, indole, formamide, benzamide, acetamide, imidazoline, or morpholine. Particularly suitable oxidizing biocides can include ammonium salts reacted with an oxidant, for example, ammonium bromide or ammonium sulfate or ammonium carbamate, or any other ammonium salt, which is reacted with an oxidant, e.g., hypochlorite, or urea reacted with an oxidant, e.g., hypochlorite. Preferred oxidizing biocides are selected from monochloramine (MCA), chlorine dioxide, performic acid (PFA), peracetic acid, alkali and alkaline earth hypochlorite salts, and N-hydrogen compounds combined with an oxidant.

The biocide is used in an amount effective to reduce microbial growth and subsequently reducing production of new amylase enzyme thereby decreasing or preventing starch degradation. The amounts to be used for amylase enzyme inhibitor, such as zinc ions, and the biocide depend on the starch containing pulp or process flows to be treated and the type of the biocide used.

In an embodiment of the invention, the zinc source can be used in amount to provide about 0.1 to 1000 ppm, preferably about 1 to 500 ppm, more preferably about 2 to 100 ppm, and even more preferably about 5 to 20 ppm $Zn^{2+}$ ions in the starch-containing pulp or process flow to be treated.

In an embodiment of the invention, the oxidising biocide is preferably used in an amount to provide a concentration of about 0.1 to 100 ppm, preferably about 0.1 to 50 ppm, more preferably about 0.1 to 15 ppm and even more preferably about 0.5 to 10 ppm, based on the active compound content of the oxidizing biocide in the starch-containing pulp or process flow to be treated.

According to an embodiment of the invention, the non-oxidising biocide is preferably used in an amount of about 0.1 to 1000 ppm, preferably about 1 to 500 ppm, more preferably about 5 to 100 ppm based on the active compound content of the non-oxidizing biocide in the starch-containing pulp or process flow to be treated.

In an embodiment of the invention, both amylase enzyme inhibitor and at least biocide are added to pulp or process flow. According to an embodiment of the invention, the Zn ions and the oxidising biocide can be used in a ratio of about 1:1 to 100:1. In a preferred embodiment, the Zn ions and the oxidizing biocide are present in a ratio of about 1:10 to 100:1, preferably about 1:5 to 20:1, more preferably about 1:2 to 5:1, based on the weights of the components. According to an embodiment of the invention, the Zn ions and non-oxidizing biocide can be used in a ratio of about 1:10 to 10:1. In a preferred embodiment, Zn ions and non-oxidizing biocide are present in a ratio of about 1:20 to 20:1, preferably about 1:10 to 10:1, more preferably about 1:5 to 5:1, based on the weight of the components.

The amphoteric polymer according to the invention comprises at least cationic and anionic monomers. According to an embodiment of the invention the amphoteric polymer consists of cationic, anionic and non-ionic monomers.

According to a preferred embodiment of the invention the amphoteric polymer is amphoteric polyacrylamide which is obtained by copolymerisation of acrylamide or methacrylamide together with both anionic and cationic monomers. Preferably amphoteric polyacrylamide is obtained by copolymerisation of acrylamide together with both anionic and cationic monomers. In the context of the present application the term "amphoteric polyacrylamide" denotes a polyacrylamide where both cationic and anionic groups are present in an aqueous solution at pH 7.

According to an embodiment of the invention, the mass average molecular weight of the amphoteric polyacrylamide may be in the range of 1 000 000-12 000 000 g/mol. According to a typical embodiment of the invention, the mass average molecular weight of the amphoteric polyacrylamide may be in the range of 1 500 000-6 000 000 g/mol, preferably 2 500 000-4 500 000 g/mol, more preferably 2 700 000-4 300 000 g/mol. It has been observed that when the average molecular weight of the amphoteric polyacrylamide is over 1 500 000 g/mol it provides good attachment and bridging between the fibres. Thus according to an embodiment of the invention the mass average molecular weight of the amphoteric polyacrylamide is over 1 500 000 g/mol. By using the amphoteric polyacrylamide having the mass average molecular weight over 1 500 000 g/mol, preferably in the range of 1 500 000-12 000 000 g/mol, it is achieved benefits in the papermaking process such as improved retention and drainage. The amphoteric polyacrylamide affects also paper strength by improving binding of the starch to the fibres. In this application the value "mass average molecular weight" is used to describe the magnitude of the polymer chain length. Mass average molecular weight values are calculated from intrinsic viscosity results measured in a known manner in 1N NaCl at 25° C. by using an Ubbelohde capillary viscometer. The capillary selected is appropriate, and in the measurements of this application an Ubbelohde capillary viscometer with constant K=0.005228 was used. The average molecular weight is then calculated from intrinsic viscosity result in a known manner using Mark-Houwink equation $[\eta]=K \cdot M^a$, where $[\eta]$ is intrinsic viscosity, M molecular weight (g/mol), and K and a are parameters given in Polymer Handbook, Fourth Edition, Volume 2, Editors: J. Brandrup, E. H. Immergut and E. A. Grulke, John Wiley & Sons, Inc., USA, 1999, p. VII/11 for poly(acrylamide). Accordingly, value of parameter K is 0.0191 ml/g and value of parameter "a" is 0.71. The average molecular weight range given for the parameters in used conditions is 490 000-3 200 000 g/mol, but the same parameters are used to describe the magnitude of molecular weight also outside this range. pH of the polymer solutions for intrinsic viscosity determination is adjusted to 2.7 by formic acid to avoid probable poly-ion complexation of amphoteric polyacrylamides.

The amphoteric polyacrylamide may comprise at least 85 mol-% structural units derived from acrylamide and/or methacrylamide monomers and <15 mol-% of structural units originating anionic and cationic monomers. The percentage values are calculated from the total dry weight of the polymer.

According to an embodiment the amphoteric polyacrylamide has a net cationic charge. This means that the net charge of the amphoteric polyacrylamide remains positive, even if it contains anionic groups. Cationic net charge improves the interaction of the amphoteric polyacrylamide with the fibres. The net charge of the amphoteric polyacrylamide is calculated as the sum of the charges of the cationic and anionic groups present. According to an embodiment 10-90%, preferably 30-90%, more preferably 50-85%, even more preferably 60-80%, of the charged groups in the amphoteric polyacrylamide are cationic for improving binding of the starch to the fibres. The amphoteric polyacrylamide according to the invention having the mass average molecular weight over 1 500 000 g/mol and carrying both anionic and cationic charge can bind the starch to the fibres and thereby contributing paper strength.

The total ionicity of the amphoteric polyacrylamide is in the range of 2-70 mol-%, preferably 2-50 mol-%, more preferably 4-30 mol-%, even more preferably 6-10 mol-%. Total ionicity includes all groups having ionic charge in the amphoteric polyacrylamide, most of the charged groups originating from the ionic monomers, but including also other charged groups originating from chain termination agents or the like. It has been observed that it is beneficial when the total ionicity of the polymer for strength enhancing purposes is <70 mol-%, especially when the average molecular weight of the polymer is 1 000 000-12 000 000 g/mol, preferably 1 500 000-12 000 000 g/mol or 1 500 000-6 000 000 g/mol.

The cationic groups in the amphoteric polyacrylamide may originate from monomers selected from 2-(dimethylamino)ethylacrylate (ADAM), [2-(acryloyloxy)ethyl] trimethylammonium chloride (ADAM-Cl), 2-(dimethylamino) ethyl acrylate benzylchloride, 2-(dimethylamino)ethyl acrylate dimethylsulphate, 2-dimethylaminoethyl methacrylate (MADAM), [2-(methacryloyloxy)ethyl] trimethylammonium chloride (MADAM-Cl), 2-dimethylaminoethyl methacrylate dimethylsulphate, [3-(acryloylamino)propyl] trimethylammonium chloride (APTAC), [3-(methacryloylamino)propyl] trimethylammonium chloride (MAPTAC) and diallyldimethylammonium chloride (DADMAC). Preferably the cationic groups in the amphoteric polyacrylamide may originate from monomers selected from [2-(acryloyloxy)ethyl] trimethylammonium chloride (ADAM-Cl), [3-(acryloylamino)propyl] trimethylammonium chloride (APTAC), and [3-(methacryloylamino)propyl] trimethylammonium chloride (MAPTAC). More preferably the cationic monomer is [2-(acryloyloxy)ethyl] trimethylammonium chloride (ADAM-Cl).

The anionic groups in the amphoteric polyacrylamide may originate from monomers selected from unsaturated mono- or dicarboxylic acids, such as acrylic acid, maleic acid, fumaric acid, itaconic acid, aconitic acid, mesaconic acid, citraconic acid, crotonic acid, isocrotonic acid, angelic acid or tiglic acid. Preferably the anionic groups originate from acrylic acid or itaconic acid.

The amphoteric polymer used in the method according to the invention may also be a copolymer of the vinylamine and acrylic acid and their derivates or salts, or cationised carboxymethyl cellulose (CMC).

According to an embodiment of the invention at least one cationic coagulant may also be added to pulp flow or to an aqueous process flow comprising starch having low molecular weight for improving starch retention to the fibres. In this application the terms "coagulant" and "fixative" are interchangeable and they are used as synonyms to each other. Typically, the cationic coagulant is added after the addition of the amphoteric polymer so that the coagulant comes into a contact with the agglomerate which is formed, when low molecular weight starch is bound or attached to amphoteric polymer or absorbed on the amphoteric polymer.

According to an embodiment of the invention, the charge density of the cationic coagulant is at least 2 meq/g active substances determined at pH 7.

According to an embodiment of the invention the coagulant is selected from the group comprising bentonite, colloidal silica and conventional papermaking fixatives, such as polydiallyldimethylammonium chloride (poly-DADMAC) or polyamines, polyvinyl amine (PVAm), cationic polyacrylamide (C-PAM), polyethyleneimine (PEI), polyamidoamine-epichlorohydrin (PAAE), polyaluminum chloride, alum, methacrylamidopropyltrimethylammonium chloride (MAPTAC) and their mixtures. Preferably, the coagulant is polyaluminum chloride.

The coagulant(s) is typically added as aqueous dispersion in amount of 50-5000 g/ton pulp, typically 80-2000 g/ton pulp, preferably 100-1000 g/ton pulp, the values being given as amount of active substance.

According to an embodiment several different coagulants may be added, such as two or three different coagulants, preferably at several separate feeding locations.

The pulp or process flow, which is treated with the method according to the invention, has typically pH in the range of 6.5-9, preferably the pH of the pulp or process flow is about 7. This pH range is noticed to be optimal for the use of the amphoteric polymer.

Typically, amylase enzyme inhibitor, biocide and said amphoteric polymer can be added to a position containing starch and including components, such as microbes or free amylase enzymes, which may degrade the starch in pulp, paper and board manufacturing process. They may be added to the broke system, pulp, pulp storage tanks, to the water entering the pulper or into the pulper, water storage tanks or to pipe line before the broke or pulp storage tanks. In particular, the method according to the invention can be used in pulping of starch-containing recycled fibre and/or in broke systems.

Amylase enzyme inhibitor, biocide and said amphoteric polymer may be added directly to the pulp flow, or it may be added first to an aqueous process flow, which is later combined with the pulp flow. It is also possible to add amylase enzyme inhibitor, biocide and said amphoteric polymer both to the pulp flow and to one or several aqueous process flows.

The amylase enzyme inhibitor and/or biocide can be added simultaneously or sequentially with the amphoteric polymer to pulp or process flow. In an embodiment of the invention the amylase enzyme inhibitor and/or biocide is added prior to the addition of the amphoteric polymer.

Early addition of amylase enzyme inhibitor and/or at least one biocide is preferred, as it minimises further degradation of low molecular starch, and may improve the coagulation of the low molecular starch, and thereby improve retention of the starch to the recycled fibres.

According to an embodiment of the invention, at least one coagulant is added simultaneously with the amphoteric polymer or after the addition of said amphoteric polymer to pulp flow or process flow.

According to one embodiment of the invention the pulp flow is screened and unwanted material from the pulp flow is separated. The screened pulp flow is thickened to a higher concentration, e.g. storage concentration by separating a part of the aqueous phase from the pulp flow as a discharge flow, and the amphoteric polymer and coagulant are added to the pulp flow before the thickening step of the screened pulp or to the discharge water flow from the thickening step. In case the amphoteric polymer and coagulant is added to the pulp flow before the thickening of the pulp flow it is possible to add they either immediately after the pulping step, before the screening step or after the screening step. Addition of the amphoteric polymer and the coagulant to the pulp before the thickening step are advantageous as the enrichment of the starch to the water circulation is effectively prevented in the most processes, and a large amount of starch is effectively retained on the fibres.

EXPERIMENTAL

A better understanding of the present invention may be obtained through the following examples which are set worth to illustrate, but are not to be construed as the limit of the present invention.

Example 1: Inhibition of Starch Degradation

Starch degradation was studied in paper machine conditions. Board from a machine using recycled fiber was re-pulpered into adjusted water (pH 7, $Ca^{2+}$ 520 mg/l, conductivity 4 mS/cm) to simulate condition in paper machine broke system. The consistency of the pulp slurry was 1%. 1 µl of amylase enzyme solution (Alpha-Amylase, A6948, AppliChem) was added into 300 ml pulp slurry. It was divided into three 100 ml portions and 0, 20 or 50 ppm zinc was added into the portions. Reference bottle was pulp slurry with no amylase enzyme added. After 20 h contact time starch concentration was measured as absorbance value using conventional iodine staining at 610 nm. The results are shown in Table 1.

TABLE 1

Inhibition of starch degradation in recycled pulp.

|  | Starch amount, A610 |
|---|---|
| Control, No amylase | 0.282 |
| Amylase, 0 ppm zinc | 0.011 |
| Amylase, 20 ppm zinc | 0.151 |
| Amylase, 50 ppm zinc | 0.181 |

It can be seen from Table 1 that in the bottle with no added zinc, amylase had degraded almost all of the starch. The additions of 20 and 50 ppm zinc had preserved most of the starch in the experiment.

Example 2: Starch Retention Study

Test slurry was prepared from European testliner board, which comprises about 5% surface size starch, which was enzymatically degraded native corn starch. Dilution water was made from tap water by adjusting $Ca^{2+}$ concentration to 520 mg/l by $CaCl_2$ and by adjusting conductivity to 4 mS/cm by NaCl. Firstly, 2.7 l of dilution water was heated to 85° C. and 100 ppm of $Zn^{2+}$ was added to dilution water, which corresponds 50 ppm at pulp diluted to 1% consistency. Testliner board was cutted to 2*2 cm squares and cutted testliner was wetted for 5 minutes in dilution water at 2 concentration before disintegration. Then, slurry was disintegrated in Britt jar disintegrator with 30 000 rotations and 50 ml of white water from paper mill was added to contaminate pulp slurry by microbes in order to start degradation of starch. Finally, the obtained pulp was diluted to consistency 1% by adding dilution water and then pulp was cooled to 25° C. and stored for 20 hours in low speed stirring (Heidolph 100 rpm) before the sheet preparation.

DDA (dynamic drainage analyzer from Akribi Kemi Konsulter, Sweden) was used to measure the retention degree of starch to paper and drainage. The used test chemicals are listed below and test chemical addition times to the pulp slurry are indicated as negative time before the drainage starts in Table 3. The volume of pulp slurry in DDA was 500 ml for each test point and stirrer speed of DDA was 1000 rpm. The stirring was stopped 2 s before drainage. Vacuum was 300 mbar for 30 s after drainage started and wire opening was 0.25 mm.

Used test chemicals were:

PAC: coagulant, polyaluminum chloride, basicity 40% and Al content 7.5 weight-%.
PA: coagulant, commercial polyamine type cationic polymer Fennofix 50 (Kemira Oyj).
AMF-A: amphoteric polymer, a copolymer of MAPTAC, acrylicacid and acrylamide.
AMF-C: amphoteric polymer, a copolymer of ADAM-Cl, acrylicacid and acrylamide.
AMF-N: amphoteric polymer, a copolymer of MAPTAC, acrylicacid and acrylamide.

Properties of amphoteric polymers are presented in Table 2. Polymers were dissolved in water to 0.5% concentration and further diluted to 0.17% before addition to the test slurry.

TABLE 2

Amphoteric acrylamide copolymers.

|  | Cationic monomers [mol-%] | Anionic monomers [mol-%] | Non-ionic monomers [mol-%] | Molecular weight [g/mol] |
|---|---|---|---|---|
| AMF-A | 2 | 7 | 91 | 4 000 000 |
| AMF-C | 7 | 2 | 91 | 4 000 000 |
| AMF-N | 5 | 5 | 90 | 4 000 000 |

Determination of soluble starch was made from DDA filtrate sample. 25 ml of filtrate was added to 10 ml of 10%-w HCl and the mixture was stirred for 10 min in 50 ml breaker with magnetic stirrer and then mixture was filtrated by gravitation in a funnel with black ribbon filter paper. 1 ml of filtrated mixture was added to 0.5 ml iodine reagent, which consisted 7.5 g/l KI+5 g/l $I_2$. Absorbance value was measured at 610 nm by Hach Lange DR 900 spectrophotometer 2 min after iodine-solution was added. Zeroing of the spectrophotometer was done with the sample before iodine addition. Calibration curve for measurement is prepared by using C*film 07311 non-ionic degraded starch.

Test pulp starch content was determined by same method than DDA filtrate starch content. Starch retention was calculated by using the equation: (pulp starch−filtrate starch)/pulp starch*100%.

In addition, filtrate turbidity was measured immediately by HACH 2100 AN IS turbidimeter by using ISO 7027 method.

The results are presented at Table 3. From Table 3 it can be seen that the addition of amphoteric polymer and zinc are reducing filtrate turbidity and increasing starch retention. Further improvement is achieved by adding coagulant like PAC or PA with zinc and amphoteric polymer. PAC coagulant improves drainage time, turbidity and starch retention.

TABLE 3

Starch retention tests with DDA.

| $Zn^{2+}$ ppm vol. in pulp | PAC kg/t Al −600 s | PA kg/t dry −600 s | AMF-A kg/t dry −10 s | AMF-C kg/t dry −10 s | AMF-N kg/t dry −10 s | Drain times | Filtrate turbidity NTU | Starch retention % | Retention % |
|---|---|---|---|---|---|---|---|---|---|
| 0  |      |     |     |     |     | 10.3 | 908 | 6  | 95 |
| 50 |      |     |     |     |     | 10.4 | 882 | 5  | 95 |
| 50 |      |     |     |     | 0.7 | 12.4 | 390 | 15 | 96 |
| 50 | 0.75 |     |     |     |     | 10.2 | 653 | 11 | 94 |
| 50 | 0.75 |     | 0.7 |     |     | 6.6  | 128 | 22 | 97 |
| 50 | 0.75 |     |     | 0.7 |     | 6.1  | 108 | 14 | 100 |
| 50 | 0.75 |     |     |     | 0.7 | 7.3  | 154 | 19 | 98 |
| 50 |      | 0.5 | 0.7 |     |     | 10.9 | 236 | 16 | 97 |
| 0  |      | 0.5 | 0.7 |     |     | 10.7 | 255 | 9  | 97 |

Example 3: Starch Retention Study

Test pulp was thick stock from core board mill, which uses cationic granular starch, in this example to study starch retention. Glutaraldehyde (GL) was used as biocide and Zn ions were used as amylase enzyme inhibitor. Coagulant was commercial polyamine type cationic polymer Fennofix 50 (Kemira Oyj) and it was used in amount 1.4 kg/t. Amphoteric dry polymer product used was AMF-C, which is a copolymer of ADAM-Cl, acrylicacid and acrylamide. The added amounts of the chemicals are presented in Table 4. Reference sample does not contain any chemical additions.

The fibre stock was firstly treated with biocide and amylase enzyme inhibitor. Then after 4 h contact time the stock was diluted with process water from the same mill 60 s before drainage to 1% consistency. DDA (dynamic drainage analyzer from Akribi Kemi Konsulter, Sweden) was used to measure the retention degree of starch to paper and drainage.

The volume of stock sample in DDA was 500 ml for each test point and stirring was adjusted to 1000 rpm before drainage. Coagulant was added 60 s before drainage and amphoteric polymer AMF-C 30 s before drainage. Stirring was sopped 2 s before drainage. Vacuum was 300 mbar for 30 s after drainage started and wire opening was 0.25 mm.

Soluble starch content of DDA filtrate was determined as follows:

25 ml of filtrate was added to 10 ml of 10%-w HCl and mixture was stirred for 10 min in 50 ml breaker with magnetic stirrer. Then, mixture was filtrated by gravitation in a funnel with black ribbon filter paper. 1 ml of filtrated mixture was added to 0.5 ml iodine reagent, which consisted 7.5 g/l KI+5 g/l $I_2$. Absorbancy value was measured at 610 nm by Hach Lange DR 900 spectrophotometer 2 min after iodine-solution was added. Zeroing of the spectrophotometer was done with the sample before iodine addition. C*film 07311 non-ionic degraded starch was used as reference to make calibration equation for starch content. Starch concentration correlates linearly to the absorbance measure, i.e. increasing absorbance indicate higher starch concentration. The results are given in Table 4.

TABLE 4

Results for Performance Example 3

| Sample | Starch, mg/l | Drain time, s |
|---|---|---|
| Reference | 435 | 20.5 |
| GL 25 ppm + Zn 50 ppm | 422 | 20.1 |
| GL 50 ppm + Zn 100 ppm | 446 | 20.1 |
| GL 25 ppm + Zn 50 ppm + coagulant 1.4 kg/t + AMF-C 0.7 kg/t | 362 | 16.3 |
| GL 50 ppm + Zn 100 ppm + coagulant 1.4 kg/t + AMF-C 0.7 kg/t | 375 | 15.5 |
| GL 25 ppm + Zn 50 ppm + coagulant 1.4 kg/t + AMF-C 1.4 kg/t | 345 | 13.7 |

The results in Table 4 show that amphoteric polymer product have a positive impact on starch retention when used with coagulant since the amount of starch clearly decreased in filtrate.

The invention is not restricted to the examples of the above description, but it can be modified within the scope of the inventive idea presented in the claims.

The invention claimed is:

1. A method for treating starch in pulp, paper and board making processes, in which processes recycled fibre material is used as raw material wherein the recycled fibre material, such as paper, board and/or broke, is pulped in a pulper and obtaining a pulp flow comprising an aqueous phase and at least recycled fibres and starch dispersed in the aqueous phase,
   wherein the method comprising the following steps:
      adding amylase enzyme inhibitor and/or at least one biocide to pulp flow or to an aqueous process flow comprising starch for preventing starch degradation, and
      adding an amphoteric polyacrylamide obtained by copolymerisation of (meth)acrylamide with cationic and anionic monomers, which amphoteric polyacrylamide has the mass average molecular weight over 1 500 000 g/mol and 10-90% of the charged groups are cationic, to pulp flow or to an aqueous process flow comprising starch for binding starch to the fibres.

2. The method according to claim 1, wherein the starch is a low molecular weight starch comprising an acid or enzyme modified surface size starch.

3. The method according to claim 1, wherein the mass average molecular weight of the amphoteric polyacrylamide is in the range of 1 500 000-6 000 000 g/mol.

4. The method according to claim 1, wherein the net charge of the amphoteric polyacrylamide is cationic.

5. The method according to claim 1, wherein 30-90%, of the charged groups in the amphoteric polyacrylamide are cationic.

6. The method according to claim 1, wherein the total ionicity of the amphoteric polyacrylamide is in the range of 2-70 mol-%.

7. The method according to claim 1, wherein the cationic groups in the amphoteric polyacrylamide originate from monomers selected from 2-(dimethylamino)ethyl acrylate (ADAM), [2-(acryloyloxy)ethyl] trimethylammonium chloride (ADAM-Cl), 2-(dimethylamino)ethyl acrylate benzylchloride, 2-(dimethylamino)ethyl acrylate dimethylsulphate, 2-dimethylaminoethyl methacrylate (MADAM), [2-(methacryloyloxy)ethyl] trimethylammonium chloride (MADAM-Cl), 2-dimethylaminoethyl methacrylate dimethylsulphate, [3-(acryloylamino)propyl] trimethylammonium chloride (APTAC), [3-(methacryloylamino)propyl] trimethylammonium chloride (MAPTAC) and diallyldimethyl-ammonium chloride (DADMAC).

8. The method according to claim 1, wherein the anionic groups in the amphoteric polyacrylamide originate from monomers selected from unsaturated mono- or dicarboxylic acids, such as acrylic acid, maleic acid, fumaric acid, itaconic acid, aconitic acid, mesaconic acid, citraconic acid, crotonic acid, isocrotonic acid, angelic acid or tiglic acid.

9. The method according to claim 1, wherein amylase enzyme inhibitor comprises zinc ions.

10. The method according to claim 1, wherein at least one cationic coagulant is added to pulp flow or to an aqueous process flow comprising starch for improving starch retention.

11. The method according to claim 10, wherein the cationic coagulant is selected from the group comprising: bentonite, colloidal silica and conventional papermaking fixatives, such as polydiallyldimethylammonium chloride (poly-DADMAC) or polyamines, polyvinyl amine (PVAm), cationic polyacrylamide (C-PAM), polyethyleneimine (PEI), polyamidoamine-epichlorohydrin (PAAE), polyaluminum chloride, alum, methacrylamidopropyltrimethylammonium chloride (MAPTAC) or their mixtures.

12. The method according to claim 1, wherein biocide and/or amylase enzyme inhibitor are added simultaneously with the amphoteric polyacrylamide to pulp flow or process flow.

13. The method according to claim 1, wherein biocide and/or amylase enzyme inhibitor are added prior to the addition of said amphoteric polyacrylamide to pulp flow or process flow.

14. The method according to claim 1, wherein amphoteric polyacrylamide is added to the broke system, pulp, pulp storage tanks, to the water entering the pulper or into the pulper, water storage tanks or to pipe line before the broke or pulp storage tanks.

15. The method according to claim 1, wherein at least one coagulant is added simultaneously with the amphoteric polyacrylamide or after the addition of said amphoteric polyacrylamide to pulp flow or process flow.

16. The method according to claim 3, wherein the mass average molecular weight of the amphoteric polyacrylamide is in the range of 2 500 000-4 500 000 g/mol.

17. The method according to claim 16, wherein the mass average molecular weight of the amphoteric polyacrylamide is in the range of 2 700 000-4 300 000 g/mol.

18. The method according to claim 5, wherein 50-85%, of the charged groups in the amphoteric polyacrylamide are cationic.

19. The method according to claim 6, wherein the total ionicity of the amphoteric polyacrylamide is in the range of 2-50 mol-%.

20. The method according to claim 19, wherein the total ionicity of the amphoteric polyacrylamide is in the range of 6-10 mol-%.

\* \* \* \* \*